United States Patent
Dudar et al.

(10) Patent No.: US 9,815,342 B2
(45) Date of Patent: Nov. 14, 2017

(54) VEHICLE POSITIONING TO CHARGE TPMS BATTERIES

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/947,566

(22) Filed: Nov. 20, 2015

(65) Prior Publication Data

US 2017/0144496 A1 May 25, 2017

(51) Int. Cl.
*B60C 23/04* (2006.01)
*B62D 15/02* (2006.01)

(52) U.S. Cl.
CPC ........ *B60C 23/0486* (2013.01); *B60C 23/041* (2013.01); *B60C 23/0408* (2013.01); *B60C 23/0427* (2013.01); *B60C 23/0433* (2013.01); *B62D 15/0285* (2013.01); *B60T 2240/03* (2013.01)

(58) Field of Classification Search
CPC ............ B60C 23/0408; B60C 23/0427; B60C 23/0413; B60C 23/0433; B60C 23/041; B50T 2240/03
See application file for complete search history.

(56) References Cited

U.S. PATENT DOCUMENTS

| | | | |
|---|---|---|---|
| 7,619,509 B2 * | 11/2009 | Tanaka | B60C 23/0444 340/442 |
| 8,330,594 B2 | 12/2012 | Suzuki et al. | |
| 2005/0258950 A1 | 11/2005 | Sahashi et al. | |
| 2012/0098483 A1 * | 4/2012 | Patel | B60L 11/182 320/108 |
| 2013/0025751 A1 | 1/2013 | Dassano et al. | |
| 2013/0030615 A1 | 1/2013 | Ichikawa | |
| 2014/0092236 A1 | 4/2014 | Findeisen | |
| 2014/0118134 A1 | 5/2014 | Won | |
| 2015/0077046 A1 | 3/2015 | Huang et al. | |
| 2015/0217655 A1 | 8/2015 | Sankaran et al. | |
| 2017/0136906 A1 | 5/2017 | Draeger et al. | |

FOREIGN PATENT DOCUMENTS

CN 202294099 U 7/2012

OTHER PUBLICATIONS

GB Search Report dated May 23, 2017 for corresponding GB Application No. 1619608.1, 4 pages.

* cited by examiner

*Primary Examiner* — Thomas Ingram
(74) *Attorney, Agent, or Firm* — Frank A. MacKenzie; Brooks Kushman P.C.

(57) ABSTRACT

A controller may be configured to generate commands to position a vehicle relative to primary inductive charge coils that are configured to charge TPMS arrangements. A controller may further be configured to generate commands based on data indicative of electromagnetic field strength between TPMS arrangements and a corresponding coil to reduce a difference in power received by the arrangements during a charge period.

13 Claims, 7 Drawing Sheets

VEHICLE POSITIONING TO CHARGE TPMS BATTERIES

TECHNICAL FIELD

The present disclosure relates to positioning of automotive wheel tire assemblies that include inductively charged battery powered TPMS relative to an inductive source of power.

BACKGROUND

A vehicle may require tire pressure monitoring systems to measure tire pressure or other parameters. The tire pressure monitoring systems (TPMS) generally require electrical energy in order to collect tire information and transmit the information. These tire pressure monitoring systems may deplete stored electrical energy over time. An increase in the frequency of transmitted information can cause the stored electrical energy to deplete at an increased rate.

SUMMARY

A vehicle may include a pair of wheel and tire assemblies. Each wheel and tire assembly may include a pressure sensor arrangement. The vehicle or wheel and tire assemblies may further include a controller programmed to generate commands to position the vehicle relative to primary inductive charge coils. Each of the primary inductive charge coils may be configured to charge one of the arrangements. The position may be based on data indicative of electromagnetic field strength between each of the arrangements and a corresponding one of the coils. The position may reduce a difference in power received by the arrangements during a charge period. The data may define a difference between the electromagnetic field strengths. Each of the electromagnetic field strengths may be defined for a full rotation of the corresponding wheel and tire assembly. The commands may include automatic parking commands.

DETAILED DESCRIPTION

Figure 1:
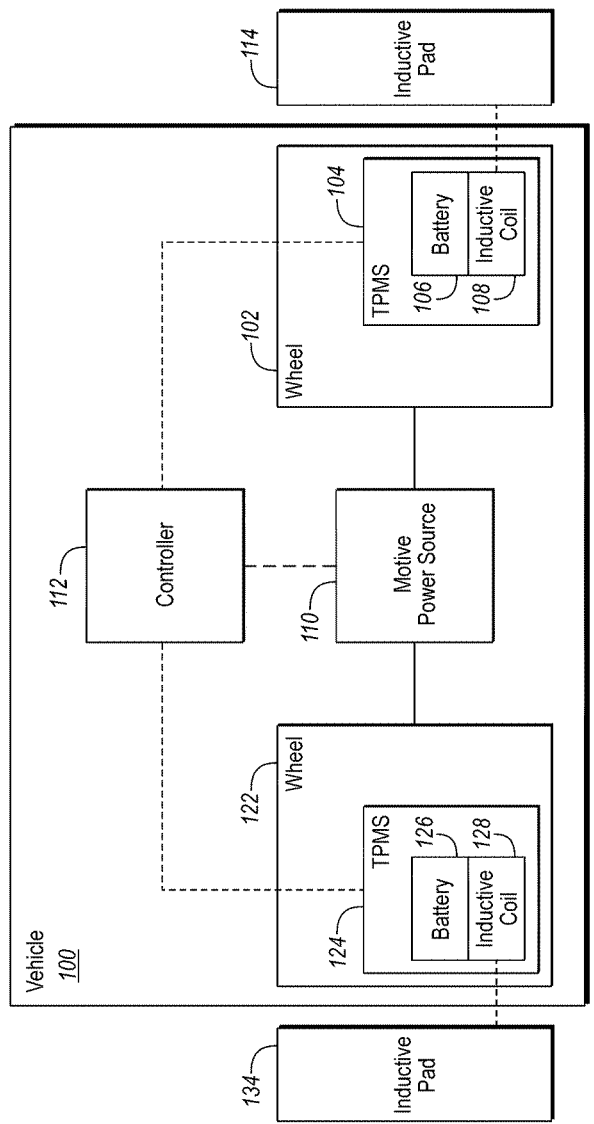
FIG. 1 is a block diagram of a vehicle.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles can be purchased with tire pressure monitoring systems (TPMS) installed on each wheel to monitor tire pressure. The systems may include a sensor, battery, and transmitter. A sensor may have multiple arrangements and may sense tire pressure by a capacitive, piezoelectric, or other available means. Capacitive sensors measure changes in an electric field across a dielectric, while piezoelectric sensors measure changes in strain across a material.

A transmitter may transmit tire pressure data to the vehicle's control system, and the information may be displayed for a driver. Tire pressure information may be used by the driver to determine whether a tire is under or over pressurized. This information may prompt the driver to take the vehicle in for service. The TPMS also provides the driver with indication of an impending flat tire due to a rupture of the inner tube by measuring the tire pressure over time. An unexpected, steady decline in tire pressure may indicate a ruptured inner tube. Any type of transmitter may be applied to send tire pressure data or other information to the vehicle's control system, and any type of transmission protocol or medium is acceptable.

Electricity is required to provide power to the sensor and transmitter. Power is typically provided by a battery but may be provided by a capacitive power source or other known suitable power source. Any battery or capacitor configuration may be used. A battery may be arranged in an array with other batteries to provide additional voltage or longevity, and any type of battery may be used. There are many known battery types including different combinations of electrolyte, anode material, cathode material, or combination thereof and any of these may power a TPMS. The battery may also be either a three-volt lithium-ion battery or a 1.25-volt nickel-metal hydride battery.

Batteries may lose charge over time. Batteries can be either recharged using direct electrical connection or inductive charging. Inductive charging via a primary coil connected to a power source and a secondary coil connected to the battery may provide adequate recharging of the TPMS. The primary inductive coil may be located on the vehicle itself or located in a charging area. The primary inductive coil located in a charging area may be a mat located on the ground, walls, or ceiling. A vehicle with inductively rechargeable TPMS batteries may pull into a charging area (e.g., garage, commercial charging station, or private charging station) and the batteries may receive inductive charging.

The degree of charge received by the secondary coil is directly related to the inductive field or electromagnetic field strength received by the secondary coil. The distance between the secondary coil relative to the primary coil should be minimized to ensure a desirable amount of charging is received. In addition, the orientation of the secondary coil with respect to the primary coil may have an impact on the received charge. The relative position of the secondary coil within the TPMS, with respect to the primary coil within the wheel assembly, provides additional problems associated with inductive charging. Due to the nature of a revolving secondary coil located on a wheel, the wheel's position may have a direct effect on the inductive charge received by the TPMS.

Each wheel may contain its own inductive coil and have a corresponding primary coil. Each inductive coil, primary or secondary, may be comprised of multiple inductive coils with different arrangements to provide suitable transmission or reception of electromagnetic fields. Various core or winding materials or configurations may be used to provide adequate inductive coupling. Any number of inductive pads may be used. A pad may be available for each wheel or each wheel may collectively use one large pad.

Each wheel may have a secondary inductive coil that has a different position or orientation within each respective wheel causing disparate charging of the TPMS batteries. The secondary coil may have many configurations designed to maximize the reception of the inductive charge. The secondary coil may be configured to accept the inductive charge from multiple directions to ensure that the inductive charge is not diminished because of the particular attitude of the secondary coil relative to the primary coil. An uncharged battery may cause a reduction in transmission frequency of the sensed pressure or an inability of the device to transmit pressure data altogether.

In at least one embodiment, a driver may cause a vehicle, including at least two tire pressure sensor arrangements, to approach or overlay charging pads. As the tire pressure sensor arrangements approach or overlay the charge pads, data related to the received electromagnetic field strength or charge is taken. Each wheel may complete a full rotation or a partial rotation while on the pad. The controller may analyze the received charging power to further position the vehicle, and the vehicle's wheels, in an optimal position.

If two wheels require charging, the controller may subtract the received inductive charge from a first wheel from the received inductive charge from a second wheel. By taking an absolute value of the difference between the received charge at each of the wheels, the controller can determine a wheel position that would reduce the difference between the charges received. A similar method could be applied to more than two wheels using other mathematical methods (e.g., determining the average difference between all of the wheels, analyzing statistically using standard deviation values to remove outliers, etc.). This method may also be applied to charge an unused TPMS (e.g., spare tire) that requires charging.

Each wheel may complete a full rotation on the pad. This may cause the minimum difference position to arise in two separate places. The controller may then pick between the two by adding the received charge values at the minimum difference locations and finding a maximum sum. The maximum sum may allow the controller to pick between the two minimum differences.

The controller may use angular wheel position or linear wheel position as a reference to determine the minimum difference inductive charging position. Use of angular wheel position may comprise recording the relative angular position of the wheel from the time an inductive field is detected using a rotational sensor (e.g., hall sensor, rotary encoder, optical encoder, or rotary displacement sensor). Those angular positions, along with corresponding charge magnitudes, may be used to return the wheel to an optimal position.

Use of a linear wheel position may comprise recording the relative linear position of the wheel from the time an inductive field is detected by using preconfigured position data related to the charge station. A vehicle may be pre-programmed or use a learning algorithm to determine the linear position of the wheels as the vehicle approaches. Those linear positions, along with corresponding charge magnitudes, may be used to return the wheel to an optimal position.

An increase in the frequency of transmitted information can cause the stored electrical energy to deplete at an increased rate, but the ability of the TPMS to recharge allows the TPMS to transmit information more frequently. This may allow the TPMS to provide road condition information and more contemporaneous tire pressure information.

In one embodiment, a driver may cause a vehicle, including at least two tire pressure sensor arrangements, to approach or overlay charging pads. The controller may take data related to the received charge as the TPMSs superimpose the charge pads. Each received charge that is taken is processed and the controller may use the aforementioned methods to determine the minimum difference position.

In a second embodiment, a driver may cause a vehicle, including at least two tire pressure sensor arrangements, to superimpose charging pads. The controller may take data related to the received charge as the TPMSs superimpose the charge pads. Each received charge that is taken is processed and the controller may stop, or provide indication to stop, because each of the secondary inductive coils is within a threshold power level. The controller may also direct the vehicle to move forward or backward to ensure that both secondary coils are receiving power that meets or exceeds the threshold level.

A controller may identify that a particular TPMS battery's state of charge (SOC) is low or has a lower SOC prior to or during the commencement of the charge period. The controller may be configured to apply a weighting factor to the desired position using the TPMS battery's SOC by using Equation 1 below for a given time period. The given time period may be a portion of the entire charging session, the entire charging session, or multiple charging sessions. Equation 1 below allows the controller to weigh, proportionally, the position of the wheels so that batteries with low charge receive a stronger inductive field or greater amount of power. Each SOC may be equivalent to the percentage of charge remaining in the rechargeable battery. The SOC may also have a non-linear gain applied to compensate for a predetermined charge period that may prevent the SOC from reaching a desirable charge level.

$$\left| \left( \frac{C_1 * SOC_1}{100} \right) - \left( \frac{C_2 * SOC_2}{100} \right) \right| \quad \text{Equation 1}$$

As shown in FIG. 1, a vehicle 100 has a first wheel and tire assembly 102. The first wheel and tire assembly 102 has a pressure sensor arrangement 104. The pressure sensor arrangement includes a battery 106. The first wheel and tire assembly 102 is mechanically connected to a motive power source 110. The motive power source 110 may be in communication with the controller 112. The controller 112 may be in communication with the pressure sensor arrangement 104. An inductive charge pad 114 may provide an electromagnetic field inductively coupled with an inductive coil 108. The inductive coil 108 may be in electrical connection with the battery 106.

As shown in FIG. 1, a vehicle 100 has a second wheel and tire assembly 122. The second wheel and tire assembly 122 has a pressure sensor arrangement 124. The pressure sensor arrangement includes a battery 126. The second wheel and tire assembly 122 is mechanically connected to a motive power source 110. The motive power source 110 may be in communication with the controller 112. The controller 112 may be in communication with the pressure sensor arrangements 124. An inductive charge pad 134 may provide an electromagnetic field inductively coupled with an inductive coil 128. The inductive coil 128 may be in electrical connection with the battery 126.

Figure 2A:
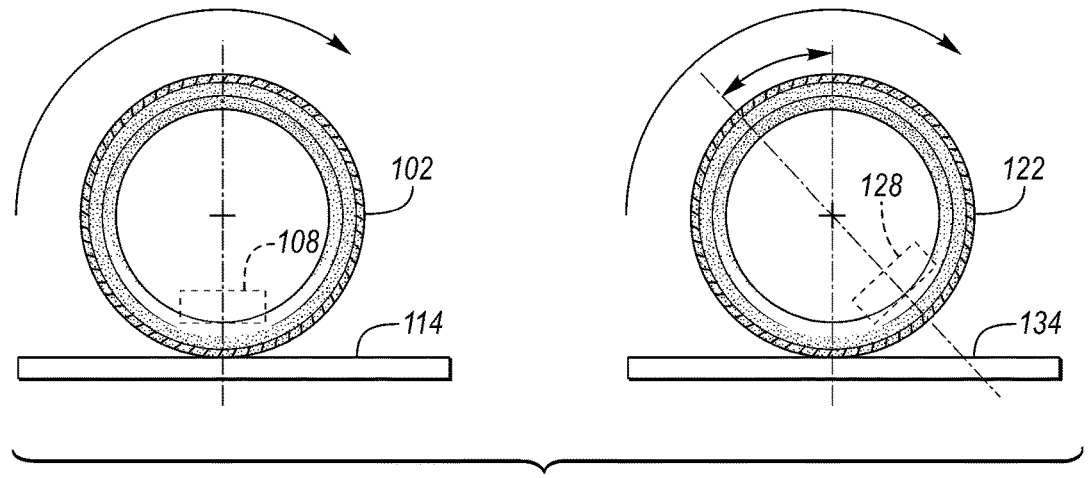
FIGS. 2A and 2B are a drawing of typical pressure sensor arrangements within wheel and tire assemblies.
Figure 2B:
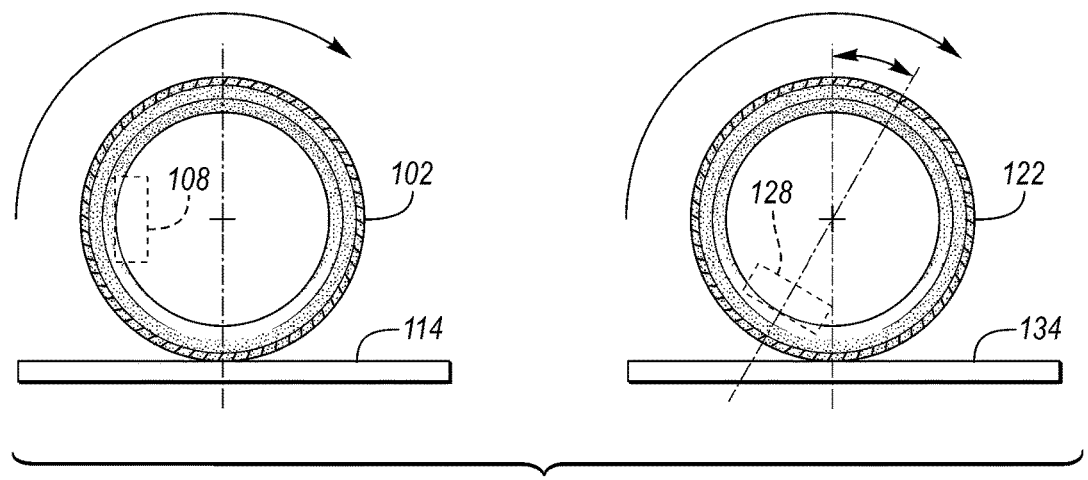

As shown in FIG. 2A, the wheel and tire assembly 102 has an inductive coil 108. The inductive coil 108 has a corresponding inductive pad 114. Similarly, the wheel and tire assembly 122 has an inductive coil 128, which has a corresponding inductive pad 134. The inductive coil 128 is out of phase with the inductive coil 108. A shown in FIG. 2B, as the wheel rotates over the inductive pad, the inductive coils receive different magnitudes of electromagnetic field based on attitude and distance in relation to the inductive pad. The inductive coils may be configured to receive inductive charge regardless of the inductive coil's attitude toward the inductive pad.

Figure 3:
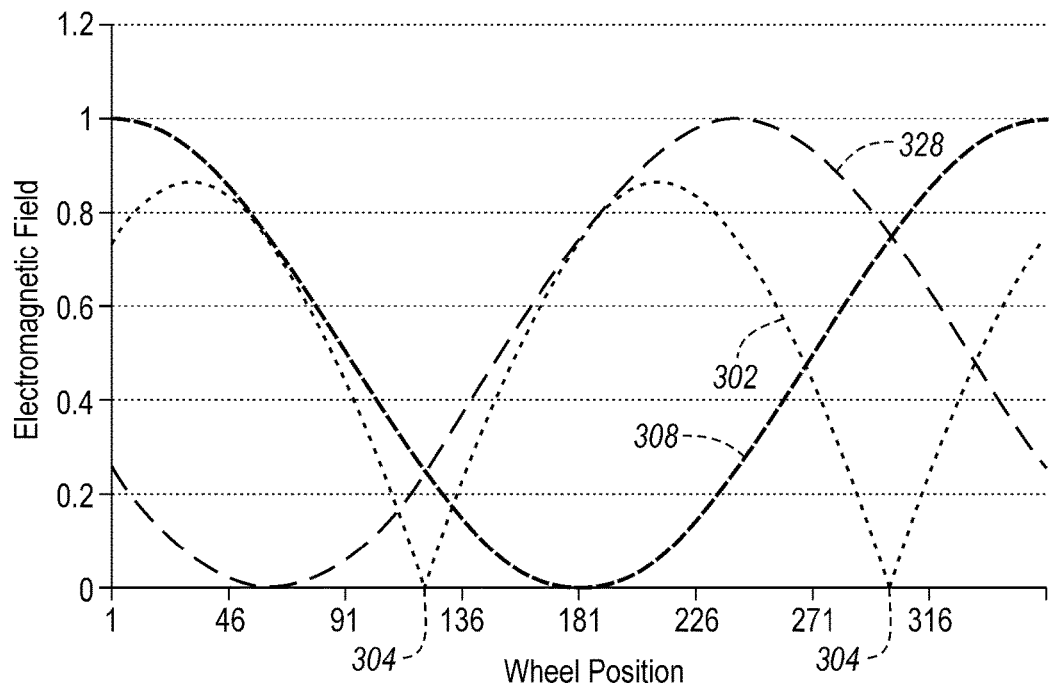
FIG. 3 is a plot of the electromagnetic field strength received at each of the pressure sensor arrangements with the arrangements offset by 120°.

FIG. 3 depicts the corresponding magnitude of received charge by each of the inductive coils 108, 128 as shown in curves 308, 328, respectively. As shown, the curves 308, 328 are 120° out of phase with each other. The Y-axis designates the received charge of the inductive coils 108, 128, and the X-axis designates the position of the wheels. The peaks of each curve 308, 328 designate the maximum charge received by the coil, which is when the coil is nearest the respective inductive pad. An alignment of the inductive coils at a position near 226° on the X-axis would result in disparate and inadequate charging of the TPMS battery associated with curve 308. A controller could be configured to orient the inductive coils to a position where the curve 302, the difference between the two charges, can be minimized. Thus, positioning the wheels at the minimum value of curve 302 would provide improved energy transfer to each of the batteries 106, 126. For example, at 120° and 300° the difference between the two wheels has reached a minimum at point 304.

Figure 4:
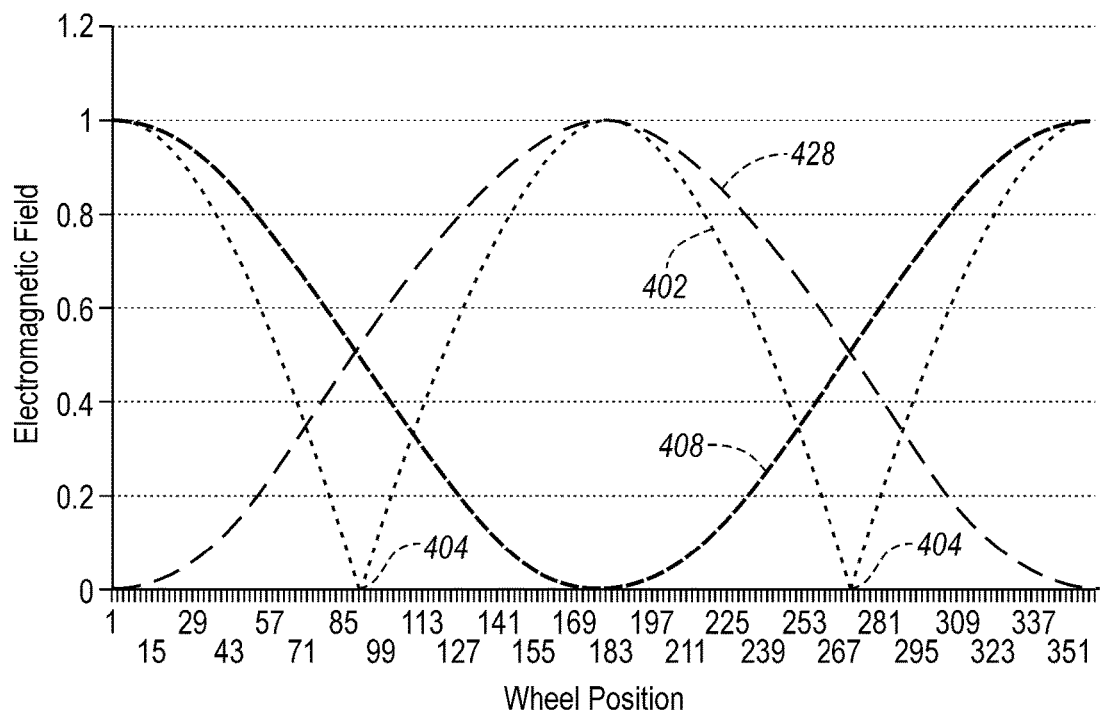
FIG. 4 is a plot of the electromagnetic field strength received at each of the pressure sensor arrangements with the arrangements offset by 180°.

FIG. 4 depicts the corresponding magnitude of received charge by each of the inductive coils 108, 128 as shown in curves 408, 428. As shown, the curves 408, 428 are 180° out of phase with each other. The Y-axis designates the received charge of the inductive coils 108, 128, and the X-axis designates the position of the wheels. The peaks of each curve 408, 428 designate the maximum charge received by the coil, which is when the coil is nearest the respective inductive pad. An alignment of the inductive coils at a position near 180° on the X-axis would result in disparate and inadequate charging of one of the TPMS batteries. A controller could be configured to orient the inductive coils to a position where the curve 402, the difference between the two charges, can be minimized. Thus, positioning the wheels at the minimum value would provide improved energy transfer to each of the batteries 106, 126. For example, at 90° and 270° the difference between the two wheels has reached a minimum at point 404.

Figure 5:
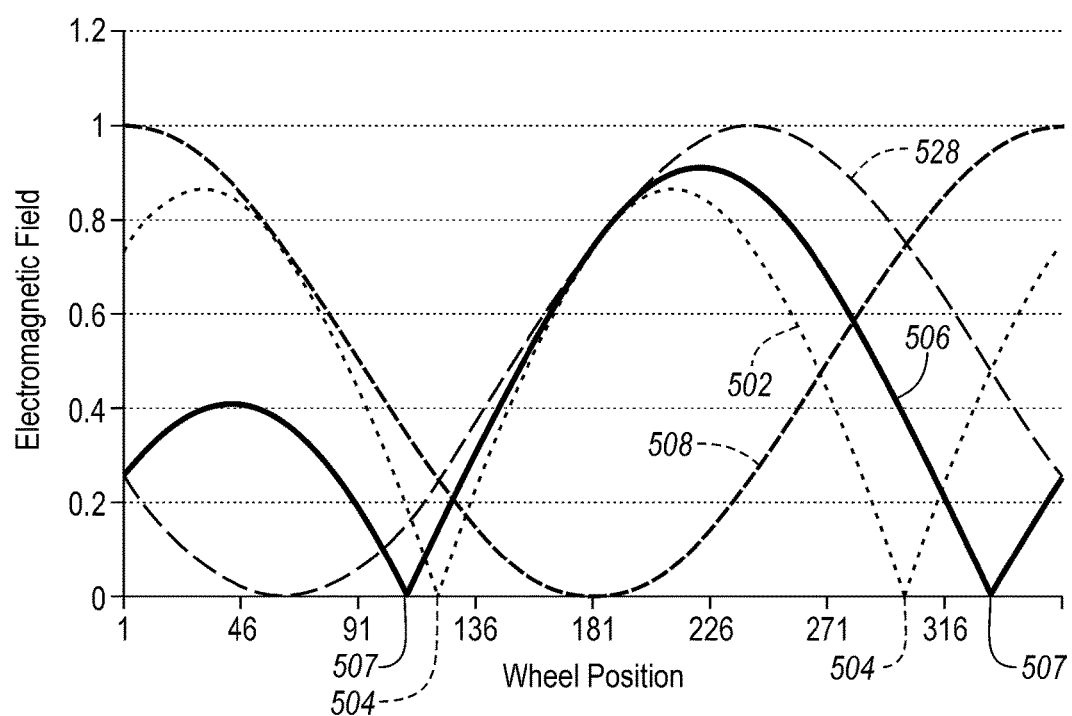
FIG. 5 is a plot of the electromagnetic field strength received at each of the pressure sensor arrangements with the arrangements offset by 120° including a curve depicting a weighted difference curve.

FIG. 5 depicts the corresponding magnitude of received charge by each of the inductive coils 108, 128 as shown in curves 508, 528, respectively. As shown, the curves 508, 528 are 120° out of phase with each other. The Y-axis designates the received charge of the inductive coils 108, 128, and the X-axis designates the position of the wheels. The peaks of each curve 508, 528 designate the maximum charge received by the coil, which is when the coil is nearest the respective inductive pad. An alignment of the inductive coils at a position near 226° on the X-axis would result in disparate and inadequate charging of each TPMS battery. A controller could be configured to orient the inductive coils to a position where the curve 502, the difference between the two charges, can be minimized. Thus, positioning the wheels at the minimum value of curve 502 would provide improved energy transfer to each of the batteries 106, 126. For example, at 120° and 300° the difference between the two wheels has reached a minimum 504.

Further, FIG. 5 introduces an additional curve 506 that depicts a weighted offset of the minimum difference curve that incorporates the state of charge of each TPMS battery. If the TPMS batteries have different states of charge when the vehicle approaches the charging station, a controller may be configured to compensate for this inequality. The computed curve 506 may follow Equation 1, as described above. The received charge magnitude of curve 508, $C_1$, of the first inductive coil is multiplied by the $SOC_1$ of the battery connected to the first inductive coil. The received charge magnitude of curve 528, $C_2$, of the second inductive coil is multiplied by the $SOC_2$ of the battery connected to the second inductive coil. A controller could be configured to orient the inductive coils to a position where the curve 506, the weighted difference between the two charges, can be minimized. Thus, positioning the wheels at the minimum value of curve 506 would provide more appropriate energy transfer to each of the batteries 106, 126. For example, at 109° and 333° the difference between the two wheels has reached a weighted minimum at point 507.

Figure 6:
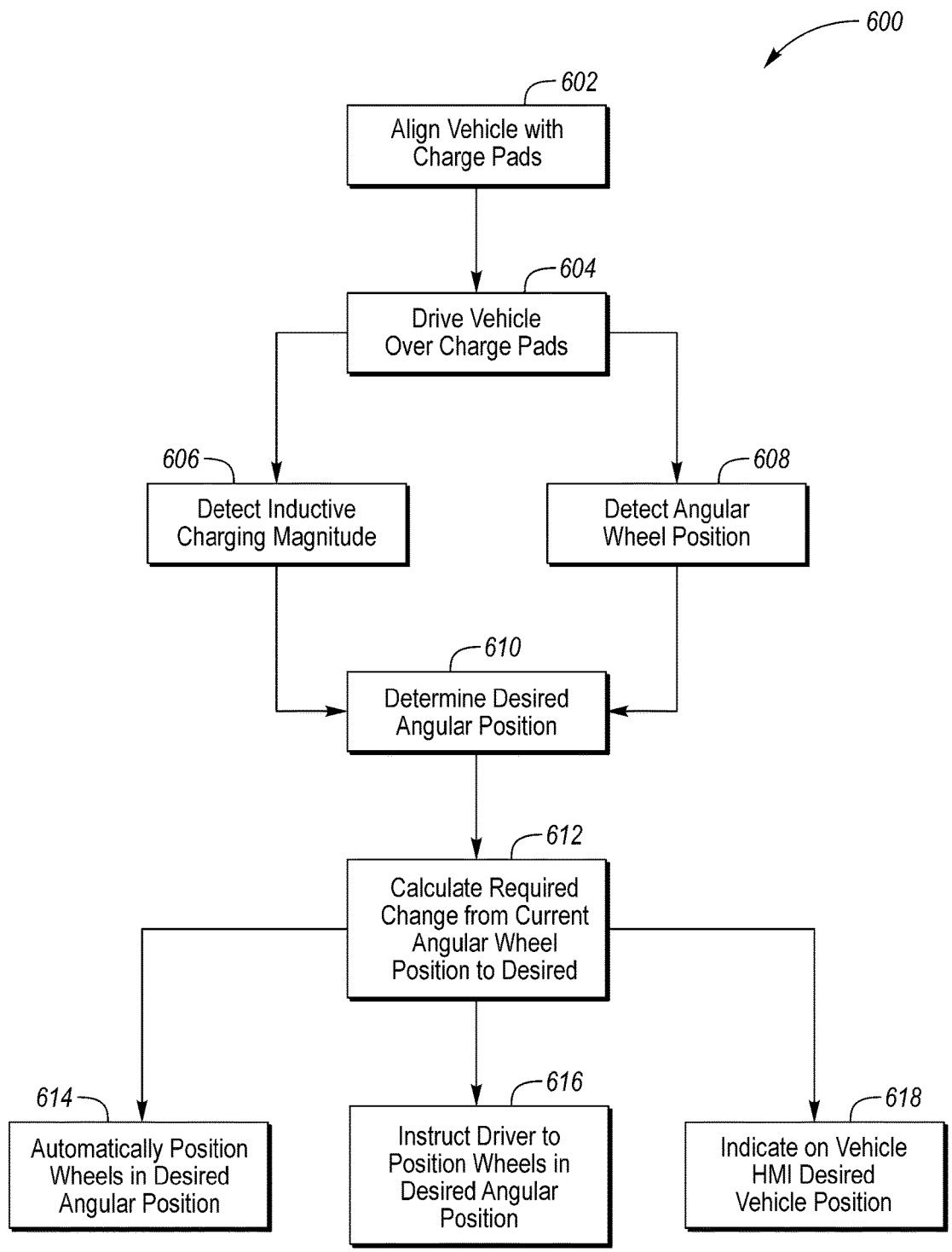
FIG. 6 is a flow chart of a control algorithm for determining proper positioning to recharge pressure sensor arrangements.

Referring now to FIG. 6, a method 600 is depicted whereby a controller performs an embodiment of this disclosure. In step 602, as the vehicle approaches the charge pads, the wheels and vehicle are aligned with the charge pads. In step 604, the vehicle is driven over the charge pads. In steps 606 and 608, during the translation over the charge pads, a controller may gather the inductive charging magnitude relative to the wheel position. In step 610, a controller may generate commands to position the vehicle such that there is a reduction in the difference between charging magnitudes at each wheel. In step 612, a controller may generate commands to position the vehicle in relation to the current wheel position and the desired wheel position. These commands may be applied autonomously in step 614, manually indicated using audio or video in step 616, or displayed on a vehicle human-machine interface in step 618. In step 614 these commands may be applied to a vehicle without a driver, i.e., a self-driving autonomous vehicle, or a vehicle with a driver but having the vehicle automatically position the vehicle without driver interaction.

Figure 7:
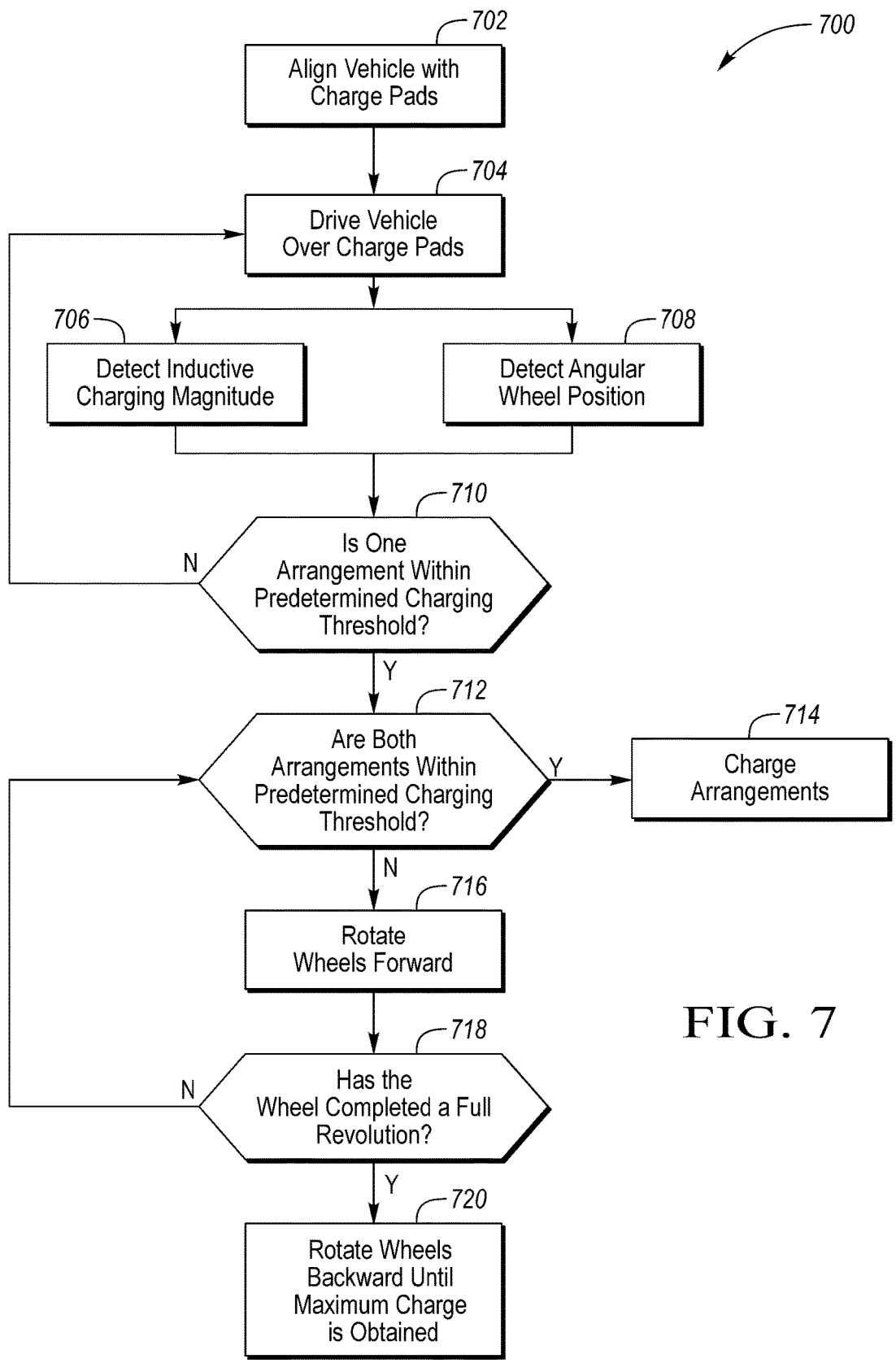
FIG. 7 is a flow chart of a control algorithm for determining whether a pair of pressure sensor arrangements is obtaining a minimum threshold of power transmission.

Referring now to FIG. 7, a method 700 is depicted whereby a controller performs an embodiment of this disclosure. In step 702, as the vehicle approaches the charge pads, the wheels and vehicle are aligned with the charge pads. In step 704, the vehicle is driven over the charge pads. In step 706 and 708, during the translation over the charge pads a controller may gather information including the inductive charging magnitude relative to the wheel position.

In step 710, a controller may determine whether one arrangement is within a predetermined threshold. The vehicle will repeat the process until at least one of the arrangements is within the predetermined threshold or predefined target power. Once one of the arrangements is within a predetermined threshold or predefined target power, the controller will continue to cross over the inductive charge pad until the other charge pad is within a predetermined range as shown in step 712. In step 714, a controller may stop the vehicle if both arrangements are in the predetermined range. In step 716, the controller may rotate the wheels forward an increment and repeat step 712. The controller may repeat step 712 until step 718 when the wheels have completed a full revolution, then the loop is exited. In step 720, once the loop has been exited, the controller may rotate the wheels backward until a maximum average charge value is obtained.

Figure 8:
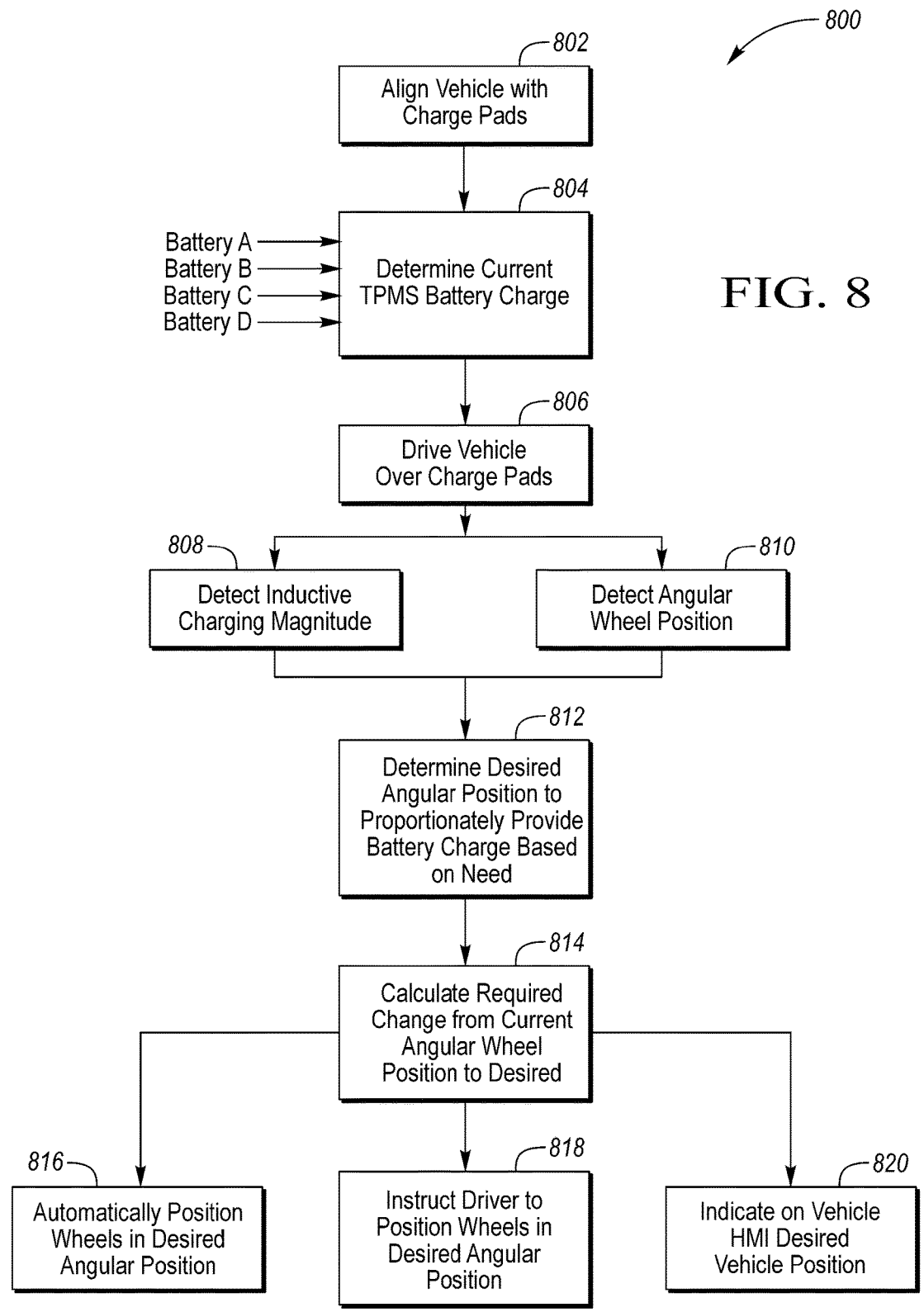
FIG. 8 is a flow chart of a control algorithm for determining the proper orientation of a pressure sensor arrangement during recharging when the arrangements have different levels of stored charge.

Referring now to FIG. 8, a method 800 is depicted whereby a controller performs an embodiment of this disclosure. In step 802 the controller may retrieve current SOC data from each TPMS arrangement. In step 804, as the vehicle approaches the charge pads, the wheels and vehicle are aligned with the charge pads. In step 806, the vehicle is driven over the charge pads. In steps 808 and 810, during the translation over the charge pads, a controller may gather the inductive charging magnitude relative to the wheel position. In step 812, a controller may generate commands to position the vehicle such that there is a reduction in the difference between charging magnitudes at each wheel, while taking into consideration the current SOC of each TPMS battery. In step 814, a controller may generate commands to position the vehicle in relation to the current wheel position and the desired wheel position. These commands may be applied autonomously in step 816, manually indicated using audio or video in step 818, or displayed on a vehicle human machine interface in step 820. A human machine interface is any mechanism or electronic device that allows interaction between the human and the machine.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a pair of wheel and tire assemblies each including a pressure sensor arrangement; and
a controller programmed to issue commands, that result in wheel movement that positions the vehicle relative to primary inductive charge coils, based on data indicative of electromagnetic field strength data corresponding to a full rotation of each of the assemblies to reduce a difference in power received by the arrangements during a charge period.

2. The vehicle of claim 1, wherein the data defines a difference between the electromagnetic field strengths.

3. The vehicle of claim 1, wherein the commands include automatic parking commands.

4. The vehicle of claim 1, wherein the commands include instructions for display.

5. The vehicle of claim 1, wherein the controller is further programmed to generate commands to position the vehicle to charge a pressure sensor arrangement associated with a spare tire.

6. A vehicle comprising:
wheel and tire assemblies each including a sensor arrangement; and
a controller programmed to issue commands, that result in wheel movement that positions the vehicle relative to inductive charge coils each configured to charge one of the arrangements, based on electromagnetic field strength data corresponding to a full rotation of each of the assemblies such that power received by each of the arrangements during a charge period exceeds a predefined target power.

7. The vehicle of claim 6, wherein the commands include automatic parking commands.

8. The vehicle of claim 6, wherein the commands include instructions for display.

9. A method comprising:
issuing commands to position a vehicle relative to primary inductive charge coils, each configured to charge a tire pressure sensor arrangement, based on corresponding electromagnetic field strength data; and
after the issuing, causing wheel movement to achieve the position such that the one of the arrangements having a lower state of charge receives, for a given time period, a greater amount of power relative to the other of the arrangements.

10. The method of claim 9, wherein the commands include automatic parking commands.

11. The method of claim 9, wherein the commands include instructions for display.

12. The method of claim 9, wherein each of the tire pressure sensor arrangements is mounted within a corresponding wheel and tire assembly and wherein the data is defined for a full rotation of at least some of the corresponding wheel and tire assemblies.

13. The method of claim 12, wherein the data defines a difference between the electromagnetic field strengths.

* * * * *